US010611397B2

(12) United States Patent
Sugiura et al.

(10) Patent No.: US 10,611,397 B2
(45) Date of Patent: Apr. 7, 2020

(54) STEERING DEVICE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Tomonori Sugiura, Yamatokoriyama (JP); Kentaro Kikuiri, Kashihara (JP); Shoji Ishimura, Kashihara (JP); Naohiro Oosono, Nara (JP); Yuuji Ishii, Shiki-gun (JP); Kosuke Ito, Shiki-gun (JP); Shigeru Hoshino, Toyota (JP)

(73) Assignees: JTEKT CORPORATION, Osaka (JP); TOYOTA JIDOSHA KABUSHIKI KAISHA, Toyota (JP)

(*) Notice: Subject to any disclaimer, the term of this patent is extended or adjusted under 35 U.S.C. 154(b) by 47 days.

(21) Appl. No.: 15/984,655

(22) Filed: May 21, 2018

(65) Prior Publication Data

US 2018/0362069 A1 Dec. 20, 2018

(30) Foreign Application Priority Data

Jun. 14, 2017 (JP) .................. 2017-116936

(51) Int. Cl.
*B62D 1/184* (2006.01)
*B62D 1/189* (2006.01)

(52) U.S. Cl.
CPC ............. *B62D 1/184* (2013.01); *B62D 1/189* (2013.01)

(58) Field of Classification Search
CPC ........ B62D 1/184; B62D 1/185; B62D 1/186; B62D 1/187; B62D 1/189
(Continued)

(56) References Cited

U.S. PATENT DOCUMENTS 5,377,555 A * 1/1995 Hancock ................ B62D 1/184
74/107
7,267,025 B2 * 9/2007 Ko ......................... B62D 1/184
74/493
(Continued)

FOREIGN PATENT DOCUMENTS

EP 3 138 757 A1 3/2017
JP 2007-083936 A 4/2007
(Continued)

OTHER PUBLICATIONS

Dec. 10, 2018 Extended Search Report issued in European Patent Application No. 18175110.8.

*Primary Examiner* — Paul N Dickson
*Assistant Examiner* — Hilary L Johns
(74) *Attorney, Agent, or Firm* — Oliff PLC

(57) ABSTRACT

A steering device includes a column shaft, a column jacket, a fastening mechanism including a fastening shaft having a first flat portion, a first tooth member, a second tooth member, an energizing member, and a release member including: a cylindrical portion having a second flat portion; and a release portion, wherein: the release member is configured to cause the release portion to be engaged with the second tooth member; and a projecting portion formed on at least one of the first flat portion and the second flat portion is elastically engaged with the other one of the first flat portion and the second flat portion and restrain backlash between the first flat portion and the second flat portion.

5 Claims, 6 Drawing Sheets

(58) Field of Classification Search
USPC .......................................... 280/775; 74/493
See application file for complete search history.

(56) References Cited

U.S. PATENT DOCUMENTS

| | | | | |
|---|---|---|---|---|
| 7,717,011 B2* | 5/2010 | Hirooka | ................ | B62D 1/184 |
| | | | | 280/777 |
| 8,550,497 B2* | 10/2013 | Takezawa | .............. | B62D 1/185 |
| | | | | 280/775 |
| 9,022,427 B2* | 5/2015 | Schnitzer | ................ | B62D 1/16 |
| | | | | 280/775 |
| 9,120,502 B2* | 9/2015 | Mihara | ................ | B62D 1/184 |
| 9,233,706 B2* | 1/2016 | Schnitzer | ................ | B62D 1/16 |
| 10,112,640 B2* | 10/2018 | Bodtker | ................ | B62D 1/184 |
| 2002/0023515 A1* | 2/2002 | Kuroumaru | ............ | B62D 1/184 |
| | | | | 74/493 |
| 2004/0035238 A1* | 2/2004 | Jolley | ................... | B62D 1/184 |
| | | | | 74/493 |
| 2006/0230864 A1* | 10/2006 | Shinohara | .............. | B62D 1/184 |
| | | | | 74/492 |
| 2011/0185839 A1* | 8/2011 | Inoue | ..................... | B62D 1/184 |
| | | | | 74/493 |
| 2012/0312117 A1* | 12/2012 | Maniwa | ................ | B62D 1/184 |
| | | | | 74/493 |
| 2013/0247708 A1* | 9/2013 | Hirooka | ................ | B62D 1/184 |
| | | | | 74/493 |
| 2015/0266499 A1* | 9/2015 | Yoshihara | .............. | B62D 1/184 |
| | | | | 74/493 |
| 2017/0066468 A1* | 3/2017 | Tomiyama | ............. | B62D 1/184 |

FOREIGN PATENT DOCUMENTS

| | | |
|---|---|---|
| JP | 2015-182614 A | 10/2015 |
| JP | 2017-094768 A | 6/2017 |

* cited by examiner

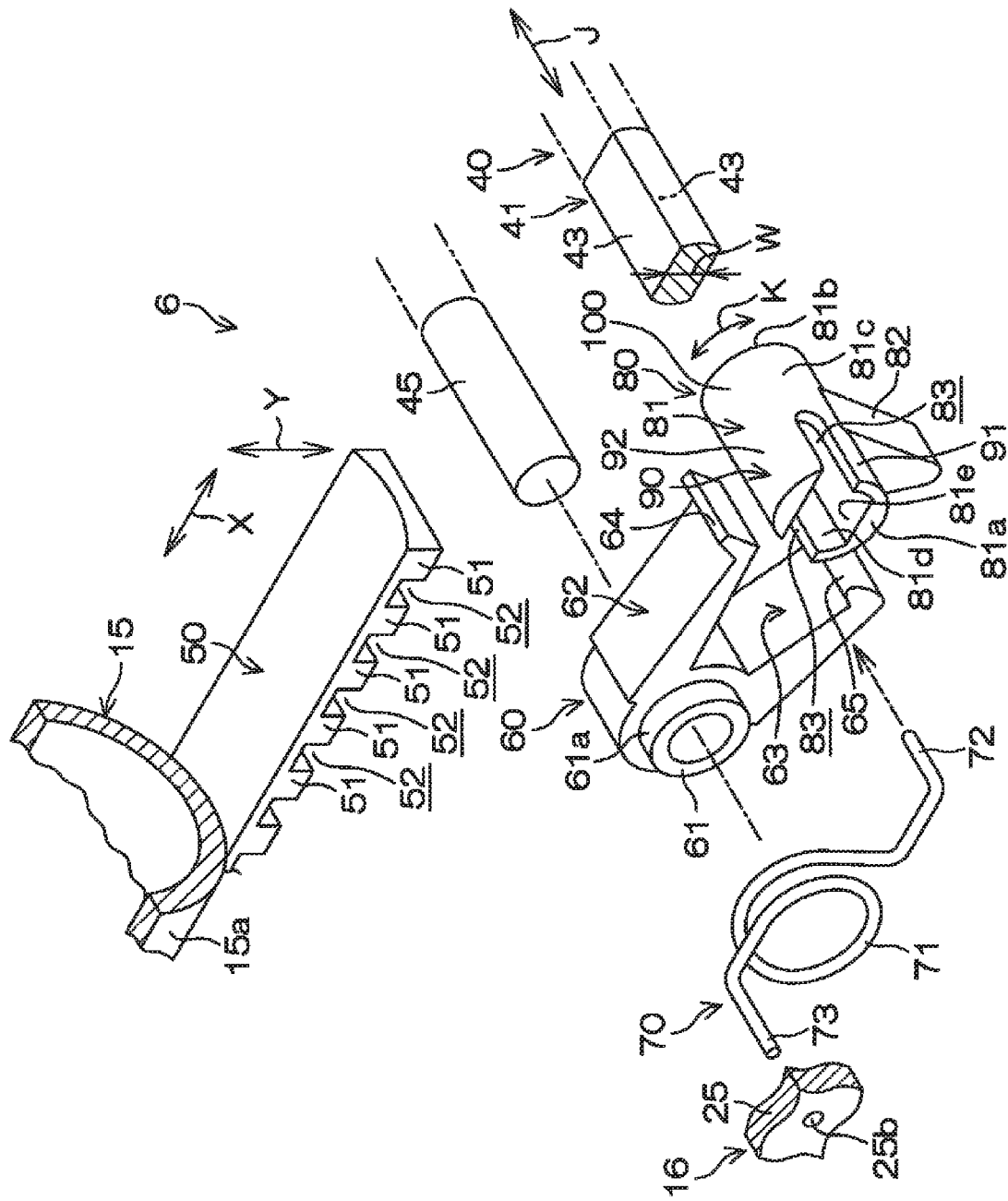

STEERING DEVICE

INCORPORATION BY REFERENCE

The disclosure of Japanese Patent Application No. 2017-116936 filed on Jun. 14, 2017 including the specification, drawings and abstract is incorporated herein by reference in its entirety.

BACKGROUND

1. Technical Field

The disclosure relates to a steering device.

2. Description of Related Art

Japanese Unexamined Patent Application Publication No. 2007-83936 (JP 2007-83936 A) discloses a steering device with a telescoping-adjustment ability. In the steering device, a tooth portion is provided in a movable-side jacket on an upper side, and a tooth member is provided in a fixed-side jacket on a lower side. The fixed-side jacket supports the tooth member so that the tooth member is able to vertically swing about a pin. The fixed-side jacket supports an adjustment bolt (a fastening shaft) that rotates integrally with an operation lever, and a pole (a cylindrical member) is fitted onto the fastening shaft. On an outer periphery of the cylindrical member, a cam surface is formed. When a lock operation is performed by the operation lever, the cam surface of the cylindrical member that rotates together with the fastening shaft pushes up the tooth member so that the tooth member swings, and the tooth member is pressed against the tooth portion.

SUMMARY

However, because of a manufacturing error, a load applied when the tooth member is pressed against the tooth portion can vary, thus making the pressing load excessive or increasing an operation load on the operation lever during the lock operation. Therefore, it is considered that, for locking, the tooth member may be rotated and displaced to a meshing position by using energizing force of an energizing member, and, for unlocking, the tooth member may be rotated and displaced by a release member to a non-meshed position against the energizing member.

However, in such a case, there may be backlash in engagement between the outer peripheral surface of the fastening shaft and an inner peripheral surface of the cylindrical member. In that case, when the release member and the tooth member are disengaged from each other in a transition from an unlocked state to a locked state, energizing reaction force of the release member against energizing force of the energizing member is released instantly, and sound of hammering can be generated between the fastening shaft and the cylindrical member. An object of the disclosure is to provide a steering device that is able to restrain generation of sound of hammering.

An aspect of the disclosure relates to a steering device including: a column shaft that is configured to extend and retract in a first axis direction; a column jacket including a lower jacket and an upper jacket fitted to the lower jacket, the column jacket supporting the column shaft so that the column shaft is configured to rotate, the column jacket being configured to extend and retract in the first axis direction during telescoping adjustment; a fastening mechanism including a fastening shaft, the fastening shaft being supported by the lower jacket and being configured to rotate, the fastening shaft having a first flat portion on an outer peripheral surface of the fastening shaft, the first flat portion extending in a second axis direction, the second axis direction being an axis direction of the fastening shaft, the fastening mechanism being configured to cause the lower jacket to fasten and hold the upper jacket via the fastening shaft; a first tooth member that is configured to move integrally with the upper jacket in the first axis direction; a second tooth member that is supported by the lower jacket so that the second tooth member is configured to rotate, the second tooth member being configured to mesh with the first tooth member as the second tooth member rotates; an energizing member that is configured to elastically energize the second tooth member so that the second tooth member meshes with the first tooth member when the fastening mechanism fastens the upper jacket; and a release member, the release member including: a cylindrical portion that is fitted onto the fastening shaft, the cylindrical portion having a second flat portion that is formed on an inner peripheral surface of the cylindrical portion, the second flat portion facing the first flat portion so as to be configured to transmit torque; and a release portion that is provided on an outer peripheral surface of the cylindrical portion and is configured to engage with the second tooth member, wherein: when the release member is rotated along with rotation of the fastening shaft toward a fastening release side, the release member causes the release portion to be engaged with the second tooth member, and thus causes the second tooth member to rotate so as to be displaced to a non-meshed side against the energizing member; and a projecting portion is formed on at least one of the first flat portion and the second flat portion, the projecting portion being elastically engaged with another one of the first flat portion and the second flat portion and restraining backlash between the first flat portion and the second flat portion.

In the steering device according to the above aspect, in an unlocked state, the release portion of the release member is engaged with the second tooth member, thus holding the second tooth member in a non-meshed state against the energizing member. During a transition from the unlocked state to a locked state, when the release portion and the second tooth member are disengaged from each other, energizing reaction force of the release member against energizing force of the energizing member is released instantly. Meanwhile, because of the projecting portion that is provided in at least one of the first flat portion of the outer peripheral surface of the fastening shaft and the second flat portion of the inner peripheral surface of the cylindrical portion of the release member, and is elastically engaged with the other one of the first flat portion and the second flat portion, backlash between both of the flat portions is restrained. Therefore, with the steering device according to the above aspect, it is possible to restrain generation of sound of hammering between both of the flat portions when the energizing reaction force is released.

In the above aspect, at least one slit may be formed in the cylindrical portion, the slit extending in an second axis direction from a first end of the cylindrical portion; and the projecting portion may be disposed in a circumferentially-discontinuous region that is discontinuous in a circumferential direction of the cylindrical portion as the slit is provided in the cylindrical portion.

With the steering device according to the above aspect, at the time of assembly, when the cylindrical portion of the release member is fitted and assembled to the fastening shaft, it is possible to elastically deform the cylindrical portion easily by the action of the slit extending in the axis direction of the cylindrical portion so as to assemble the cylindrical portion to the fastening shaft.

In the above aspect, the slit may extend from the first end to a middle portion of the cylindrical portion in the second axis direction; and the cylindrical portion may include a circumferentially continuous region that is disposed from the middle portion in the second axis direction to a second end of the cylindrical portion, the circumferentially continuous region being continuous in the circumferential direction of the cylindrical portion.

With the steering device according to the above aspect, even if a damage or the like happens in the circumferentially-discontinuous region that is discontinuous in the circumferential direction because the slit is provided in the cylindrical portion of the release member, the cylindrical portion is prevented from falling off from the fastening shaft by the circumferentially continuous region that is continuous in the circumferential direction of the cylindrical portion.

In the above aspect, a pair of the slits may be provided such that the slits are disposed at positions that face each other in a direction which is orthogonal to a direction in which the first flat portion and the second flat portion face each other; the circumferentially-discontinuous region may be divided by the slits into a release portion-side circumferential region and an opposite-side circumferential region which is on an side opposite from a release portion side; and the projecting portion may be disposed on the second flat portion in the opposite-side circumferential region.

In the steering device according to the above aspect, in the non-meshed state, engagement reaction force applied to the cylindrical portion of the release member by the second tooth member via the release portion acts in a direction in which the second flat portion of the opposite-side circumferential region is separated from the first flat portion of the fastening shaft, the second flat portion being on the opposite side with respect to the release portion side and provided with the projecting portion. Therefore, with the steering device according to the above aspect, it is possible to reduce a load applied to the projecting portion. Accordingly, permanent deformation of the projecting portion is restrained, and it is thus possible to restrain generation of sound of hammering between the first and the second flat portions for a long period of time.

In the above aspect, the cylindrical portion may have: a pair of linear edge portions extending linearly along the slit in parallel to the second axis direction; and a curved edge portion that connects the linear edge portions with each other in a curved shape and defines a closed end of the slit. A curvature radius of a first adjacent portion may be larger than a curvature radius of a second adjacent portion, the first adjacent portion being a portion of the curved edge portion adjacent to the opposite-side circumferential region, the second adjacent portion being a portion of the curved edge portion adjacent to the release portion-side circumferential region.

In the steering device according to above aspect, in the curved edge portion provided in the cylindrical portion, the curved edge portion defining the closed end of the slit extending in the axis direction, stress applied to a first adjacent portion tends to be higher than stress applied to a second adjacent portion. The first adjacent portion is adjacent to the opposite-side circumferential region that is disposed on the opposite side with respect to the release portion side and provided with the projecting portion, and the second adjacent portion is adjacent to the release portion-side circumferential region. Therefore, in the above aspect, in the curved edge portion that defines the closed end of the slit, the curvature radius of the first adjacent portion is larger than the curvature radius of the second adjacent portion. Therefore, in the steering device according to the above aspect, in the curved edge portion, it is possible to alleviate concentration of stress on the first adjacent portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a schematic exploded perspective view of a tooth locking mechanism;

DETAILED DESCRIPTION OF EMBODIMENTS

Figure 1:
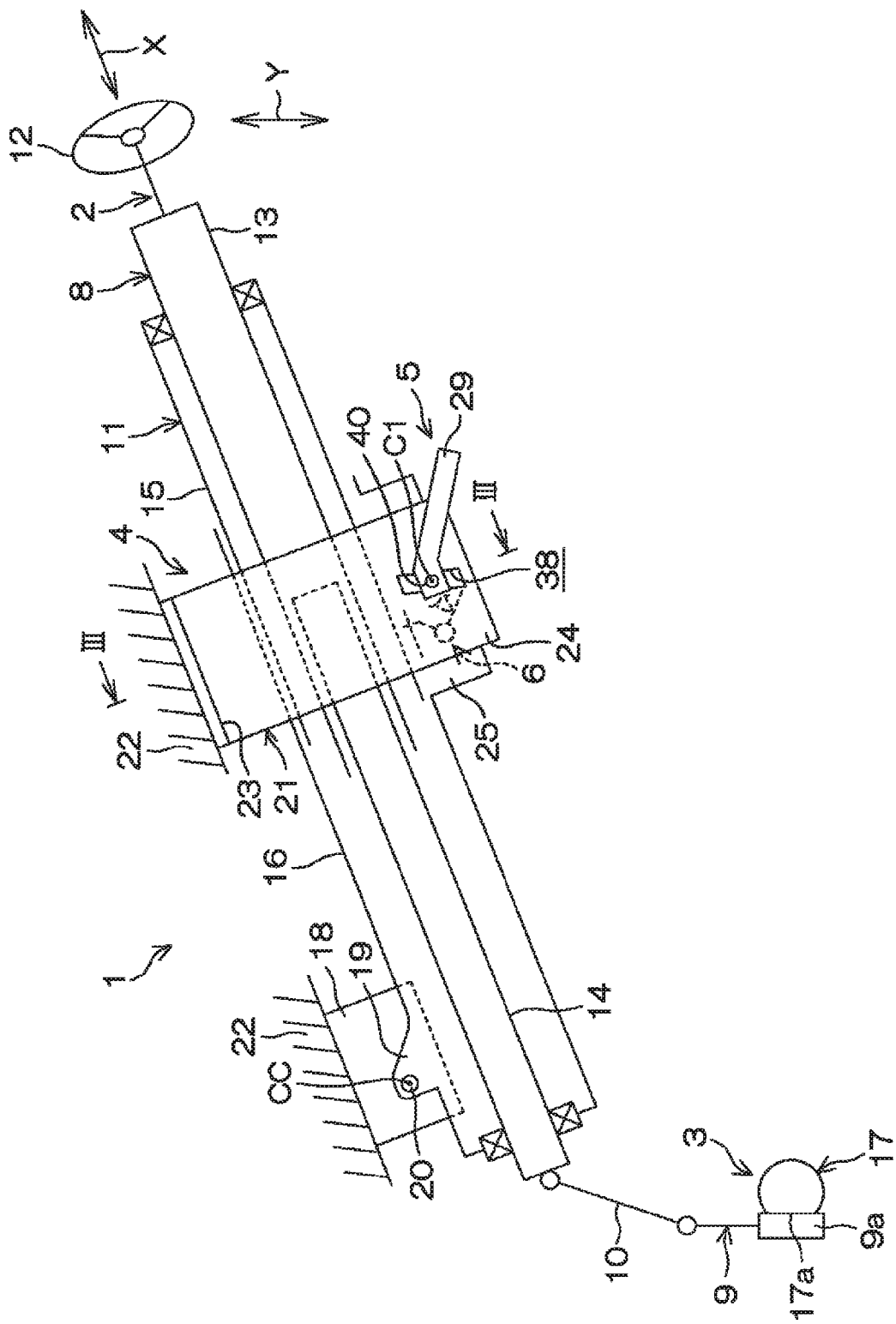
FIG. 1 is a partially sectional schematic side view of a basic structure of a steering device according to an embodiment of the disclosure.

FIG. 1 is a partially sectional schematic side view of a basic structure of a steering device according to an embodiment of the disclosure. With reference to FIG. 1, a steering device 1 includes a steering input mechanism 2, a steering output mechanism 3, a support mechanism 4, a fastening mechanism 5, and a tooth locking mechanism 6. The steering input mechanism 2 includes a column shaft 8, a pinion shaft 9, an intermediate shaft 10, and a column jacket 11. The intermediate shaft 10 is interposed between the column shaft 8 and the pinion shaft 9. The column shaft 8 is inserted in the column jacket 11, and the column jacket 11 thus supports the column shaft 8 so that the column shaft 8 is able to rotate.

The column shaft 8 includes an upper shaft 13 connected with a steering wheel 12, and a lower shaft 14 connected with the intermediate shaft 10. The upper shaft 13 and the lower shaft 14 are fitted to each other in a manner of, for example, spline-fitting or serration-fitting so that the upper shaft 13 and the lower shaft 14 are able to slide relative to each other in a column axis direction X. The column shaft 8 is able to extend and retract in the column axis direction X. A pinion 9a is formed on the pinion shaft 9.

The column jacket 11 includes an upper jacket 15 and a lower jacket 16 with a cylindrical shape. The upper jacket 15 and the lower jacket 16 are fitted to each other so that the cylindrical upper jacket 15 and the lower jacket 16 are able to slide relative to one another in the column axis direction X. The column jacket 11 is able to extend and retract in the column axis direction X. Accordingly, the steering device according to the disclosure is configured to achieve a telescoping adjustment. The "telescoping adjustment" in the disclosure refers to, for example, adjusting a length of a device including a first member and a second member, which are configured to slide with respect to each other, by sliding a first member with respect to a second member. The upper jacket 15 is, for example, an inner jacket, and the lower jacket 16 is, for example, an outer jacket. The steering output mechanism 3 has a rack shaft 17 and a tie rod (not shown). A rack 17a that meshes with the pinion 9a is formed on the rack shaft 17. One end of the tie rod is connected with the rack shaft 17, and the other end of the tie rod is connected with a steerable wheel (not shown).

When the steering wheel 12 is rotated by a driver, the pinion shaft 9 is rotated through the column shaft 8 and the intermediate shaft 10. Rotation of the pinion shaft 9 is converted by a rack and pinion mechanism to a reciprocating motion of the rack shaft 17 in the axis direction. The reciprocating motion of the rack shaft 17 changes a steering angle of the steerable wheel.

The support mechanism 4 supports the steering input mechanism 2 with respect to a vehicle body 22. The support mechanism 4 includes a lower fixing bracket 18, a column bracket 19, a tilt pivot 20, and an upper fixing bracket 21. The lower fixing bracket 18 is fixed to the vehicle body 22. The column bracket 19 is fixed to the lower jacket 16. The tilt pivot 20 is supported by the lower fixing bracket 18. The tilt pivot 20 supports the column jacket 11 via the column bracket 19 so that the column jacket 11 is able to tilt about a central axis CC of the tilt pivot 20.

Figure 2:
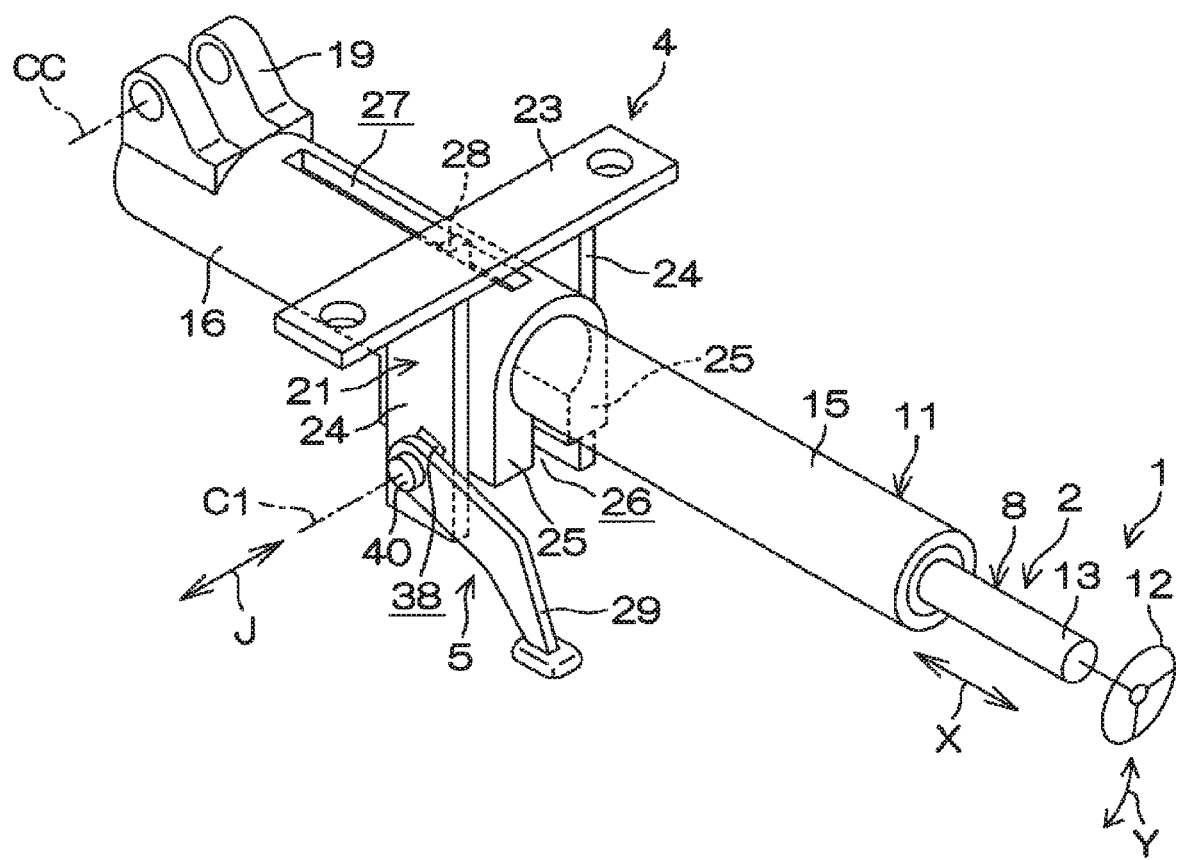
FIG. 2 is schematic perspective view of the steering device.

FIG. 2 is a schematic perspective view of the steering device 1. As shown in FIG. 1, the upper fixing bracket 21 is fixed to the vehicle body 22. The upper fixing bracket 21 includes a mounting plate 23 mounted on the vehicle body 22, and a pair of side plates 24 that extends from two ends of the mounting plate 23 in a right-left direction (equivalent to a right-left direction of a vehicle) to a lower side in a tilt direction Y, respectively, as shown in FIG. 2. As shown in FIG. 2, the lower jacket 16 includes a pair of fastened portions 25 disposed between the side plates 24. In the lower jacket 16, a slit 26 is formed. The slit 26 extends from an upper end portion (an end portion on the steering wheel 12 side) in the column axis direction X to a lower side in the column axis direction X. The fastened portions 25 are disposed on both sides of the slit 26, respectively. As the fastening mechanism 5 fastens the fastened portions 25, the lower jacket 16 is able to elastically reduce its diameter.

In the lower jacket 16, a guide groove 27 extending in the axis direction X is formed. A guided projection 28 that is fixed to the upper jacket 15 is fitted to the guide groove 27. While the guide groove 27 guides the upper jacket 15 to move in the axis direction via the guided projection 28, the guide groove 27 also restricts rotation of the upper jacket 15 with respect to the lower jacket 16. Also, because the guide groove 27 and the guided projection 28 are fitted to each other, the upper jacket 15 is prevented from coming off from the lower jacket 16.

Figure 3:
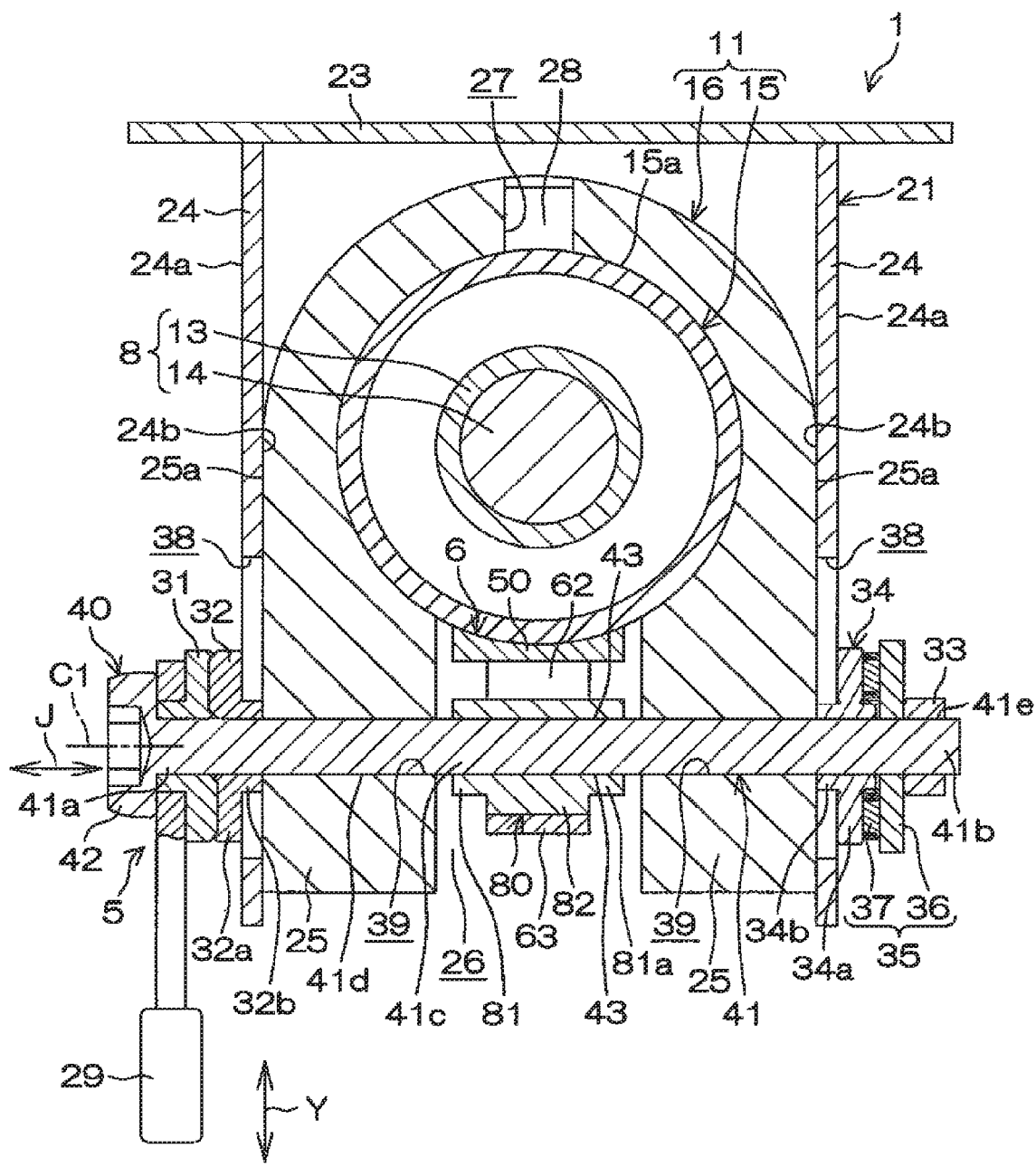
FIG. 3 is a sectional view of a main portion of the steering device, taken along the line III-III in FIG. 1.

FIG. 3 is a sectional view of a main portion of the steering device 1, taken along the line III-III in FIG. 1. As shown in FIG. 3, the fastening mechanism 5 includes an operation lever 29, a fastening shaft 40, a rotary cam 31, a first fastening member 32 (a non-rotary cam), a nut 33, a second fastening member 34, and an interposed member 35. The fastening shaft 40 is made of a bolt and includes a shaft portion 41 and a head portion 42. The shaft portion 41 includes a first end 41a, a second end 41b, and an intermediate portion 41c disposed between the first end 41a and the second end 41b. The head portion 42 is connected with the first end 41a of the shaft portion 41. A screw portion 41e is provided in an outer peripheral surface 41d of the second end 41b of the shaft portion 41, and the nut 33 is screwed to the screw portion 41e. On the outer peripheral surface 41d of the intermediate portion 41c of the shaft portion 41, a pair of first flat portions 43 is formed, extending in a fastening shaft direction J that is the center axis direction of the fastening shaft 40. A thickness W is defined between the first flat portions 43.

In each of the side plates 24 of the upper fixing bracket 21, a long hole 38 for tilting, which extends in the tilt direction Y is formed. The fastened portions 25 of the lower jacket 16 are disposed between the side plates 24 and have plate shapes that go along inner side surfaces 24b of the corresponding side plates 24, respectively. The inner side surfaces 24b of the side plates 24 face outer side surfaces 25a of the corresponding fastened portions 25, respectively. In each of the fastened portions 25 of the lower jacket 16, a fastening shaft insertion hole 39 made of a circular hole is formed. The shaft portion 41 of the fastening shaft 40 is inserted in the long holes 38 for tilting in both of the side plates 24 of the upper fixing bracket 21, and is inserted in the fastening shaft insertion holes 39 of both of the fastened portions 25 of the lower jacket 16.

The operation lever 29, the rotary cam 31, and the first fastening member 32 (equivalent to the non-rotary cam) are interposed between the head portion 42 of the fastening shaft 40 and one side plate 24 (the side plate on the left in FIG. 3). The rotary cam 31, the first fastening member 32 (the non-rotary cam), the second fastening member 34, and the interposed member 35 are supported by an outer peripheral surface of the shaft portion 41 of the fastening shaft 40. The operation lever 29 is connected with the head portion 42 of the fastening shaft 40 so that the operation lever 29 is able to rotate integrally with the fastening shaft 40. A rotary operation of the operation lever 29 is carried out by a driver. A center axis C1 of the shaft portion 41 of the fastening shaft 40 is equivalent to a center of rotation of the operation lever 29.

The second fastening member 34 and the interposed member 35 are interposed between the other side plate 24 (the side plate on the right in FIG. 3) and the nut 33. The second fastening member 34 is placed along an outer side surface 24a of the other side plate 24, and has a function of fastening the other side plate 24. The interposed member 35 includes a washer 36 and a needle roller bearing 37. The washer 36 is in contact with the nut 33. The needle roller bearing 37 is interposed between the washer 36 and the second fastening member 34.

The rotary cam 31 is connected with the operation lever 29 so that the rotary cam 31 rotates integrally with the operation lever 29. The rotary cam 31 is restricted from moving with respect to the fastening shaft 40 in the fastening shaft direction J (the direction of the center axis C1 of the fastening shaft 40). The non-rotary cam (the first fastening member 32) is engaged with the rotary cam 31 by a cam, and fastens the one side plate 24. The rotary cam 31 and the non-rotary cam (the first fastening member 32) function as a force conversion mechanism that converts operation torque of the operation lever 29 into axial force of the fastening shaft 40 which is a fastening force for fastening the side plates 24.

The first fastening member 32 (the non-rotary cam) and the second fastening member 34 have fastening plate portions 32a, 34a and boss portions 32b, 34b, respectively. The fastening plate portions 32a, 34a fasten the corresponding side plates 24, respectively, and the boss portions 32b, 34b are fitted to the corresponding long holes 38 for tilting, respectively. As each of the boss portions 32b, 34b is fitted to the corresponding long hole 38 for tilting, rotation of each of the fastening members 32, 34 is restricted. Further, the first fastening member 32 (the non-rotary cam) and the second fastening member 34 are supported by the fastening shaft 40 so that the first fastening member 32 and the second fastening member 34 are able to move in the fastening shaft direction J.

When the operation lever 29 rotates in a locking direction, the rotary cam 31 rotates with respect to the first fastening member 32 (the non-rotary cam). Then, the first fastening member 32 is moved in the fastening shaft direction J, and the side plates 24 of the upper fixing bracket 21 are clamped and fastened between the fastening plate portions 32a, 34a of both of the fastening members 32, 34. Therefore, the side plates 24 of the upper fixing bracket 21 fasten the corresponding fastened portions 25 of the lower jacket 16, respectively. As a result, the lower jacket 16 is restricted from moving in the tilt direction Y, thus achieving tilt lock. Also, since both of the fastened portions 25 are fastened, the lower jacket 16 elastically reduces its diameter, and fastens the upper jacket 15. Accordingly, the upper jacket 15 is restricted from moving in the axis direction X, thus achieving telescoping lock.

Figure 5A:
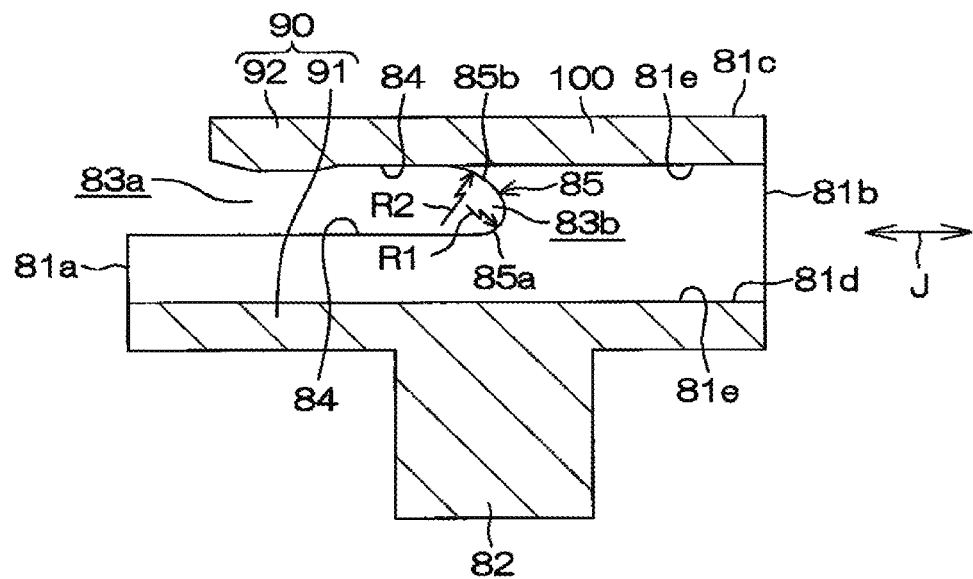
FIG. 5A is a sectional view of a release member, taken along an axis direction of a cylindrical portion of the release member.
Figure 5B:
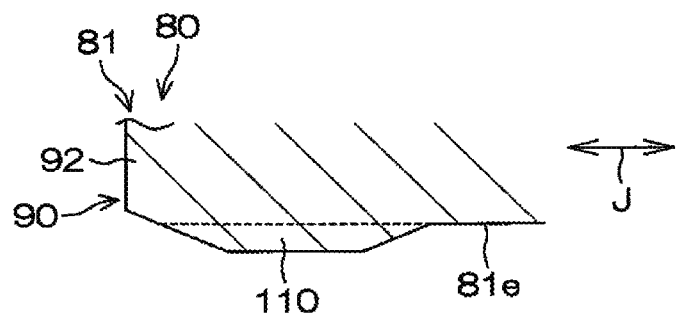
FIG. 5B is an enlarged view of a main portion of the release member shown in FIG. 5A.
Figure 5C:
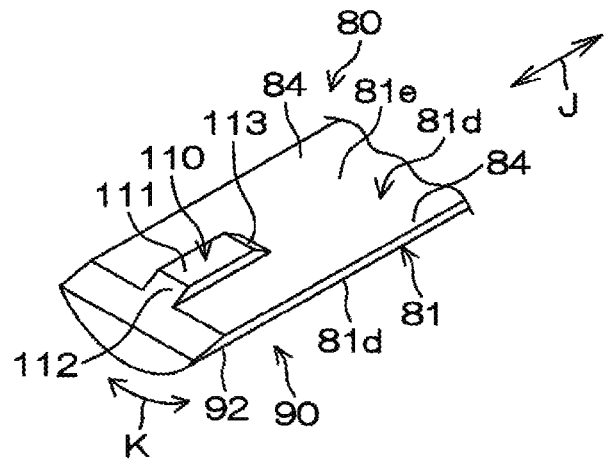
FIG. 5C is a schematic perspective view of a part of the cylindrical portion of the release member seen from an inner peripheral surface side.
Figure 6A:
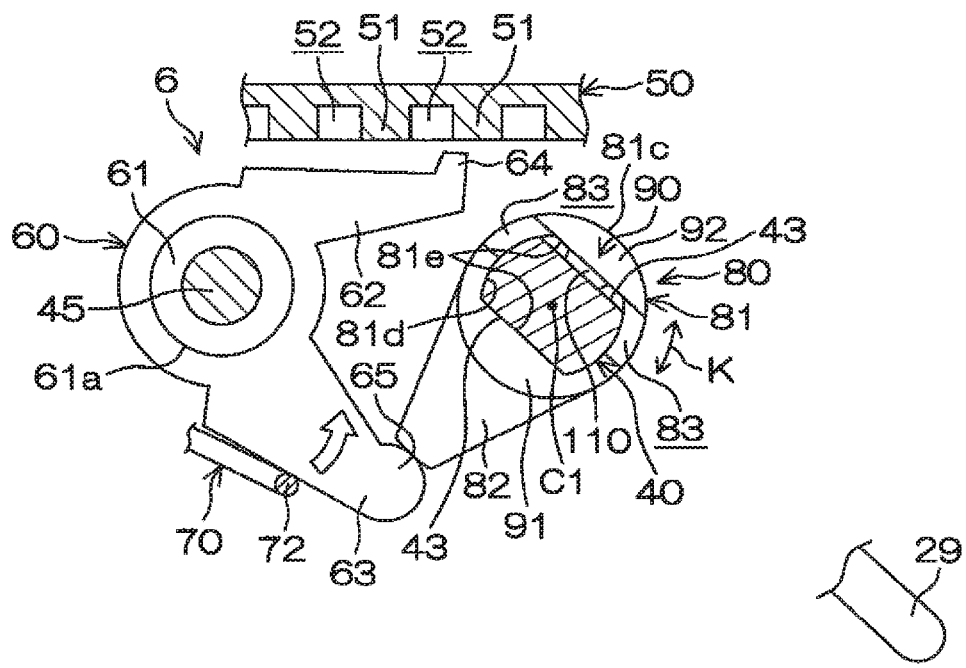
FIG. 6A is a schematic side view of a structure of the tooth locking mechanism and its peripheral area in a non-meshed state.
Figure 6B:
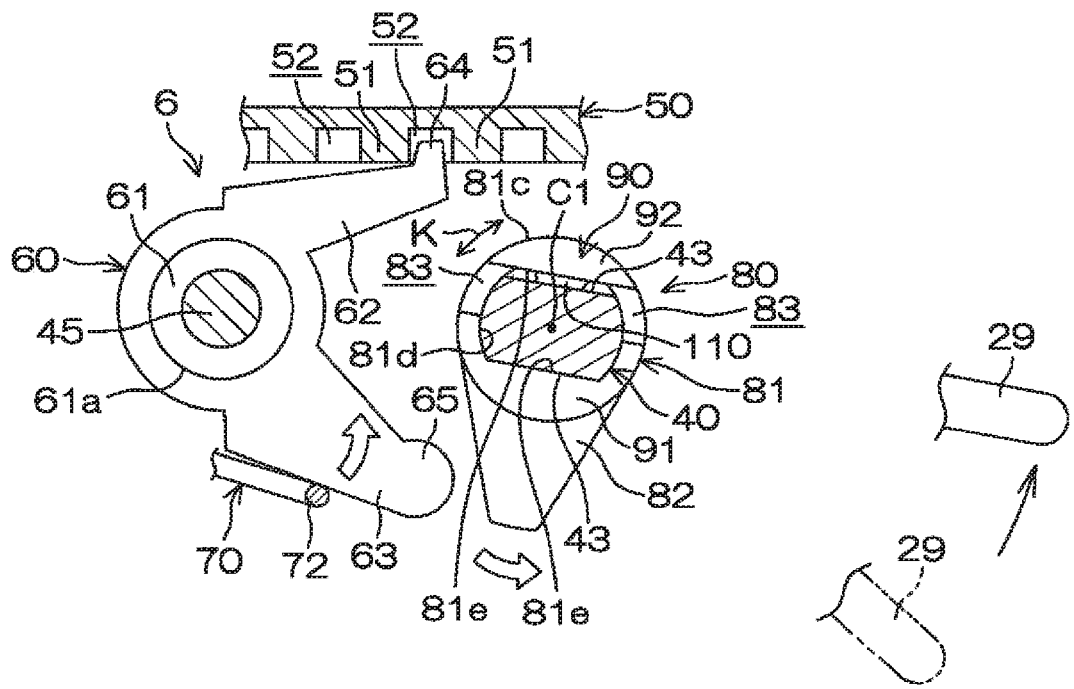
FIG. 6B is a schematic side view of the structure of the tooth locking mechanism and its peripheral area in a meshed state.

Next, the tooth locking mechanism 6 is described. FIG. 4 is a schematic exploded perspective view of the tooth locking mechanism 6. As shown in FIG. 4, the tooth locking mechanism 6 includes a first tooth member 50, a second tooth member 60, an energizing member 70, and a release member 80. FIG. 5A is a sectional view of the release member 80, FIG. 5B is an enlarged view of a main portion of the release member 80 shown in FIG. 5A, and FIG. 5C is a schematic perspective view of a part of the release member 80 seen from an inner side. FIG. 6A is a schematic side view of a structure of the tooth locking mechanism 6 and its peripheral area in a non-meshed state. FIG. 6B is a schematic side view of the structure of the tooth locking mechanism 6 and its peripheral area in a meshed state.

As shown in FIG. 4, the first tooth member 50 is fixed to an outer peripheral surface 15a of the upper jacket 15. In the first tooth member 50, a number of first tooth 51 are formed at prescribed intervals in the column axis direction X. The first tooth member 50 is obtained by forming a number of grooves 52 in a long plate at prescribed intervals in the column axis direction X. The first tooth member 50 is such formed out of the long plate. Each of the first tooth 51 may be formed between the neighboring grooves 52.

As shown in FIG. 4 and FIG. 6A, the second tooth member 60 includes an annular boss portion 61, a second tooth-formed arm 62, and a cam follower arm 63. As shown in FIG. 4 and FIG. 6A, the boss portion 61 is fitted onto a support shaft 45 that is supported by the lower jacket 16. The second tooth member 60 is supported by the support shaft 45 through the boss portion 61 so that the second tooth member 60 is able to rotate. The second tooth-formed arm 62 extends so as to project from an outer peripheral surface 61a of the boss portion 61, and a second tooth 64 is formed in a distal end portion of the second tooth-formed arm 62. The cam follower arm 63 extends so as to project from the outer peripheral surface 61a of the boss portion 61, and an engagement portion 65 having a convexly-curved shape is formed in a distal end portion of the cam follower arm 63. The second tooth-formed arm 62 and the cam follower arm 63 are disposed so as to be separated from each other in a circumferential direction of the boss portion 61. Both of the arms 62, 63 are connected with each other through the boss portion 61 at positions that form a generally V shape in a view in the axis direction of the boss portion 61. Both of the arms 62, 63 rotate integrally with the boss portion 61.

As shown in FIG. 4, the energizing member 70 is made of, for example, a torsion coil spring. The energizing member 70 includes a coil portion 71, a first engagement portion 72, and a second engagement portion 73. The coil portion 71 is disposed so as to surround the outer peripheral surface 61a of the boss portion 61 of the second tooth member 60. The second engagement portion 73 is engaged with an engagement hole 25b that is provided in the fastened portion 25 of the lower jacket 16. The first engagement portion 72 extends from one end of the coil portion 71 and is engaged with the cam follower arm 63.

As shown in FIG. 4 and FIG. 6B, the energizing member 70 elastically energizes and rotates the second tooth member 60 via the cam follower arm 63 to a side of meshing with the first tooth member 50. As shown in FIG. 4 and FIG. 5A, the release member 80 includes a cylindrical portion 81 and a release portion 82. The cylindrical portion 81 is fitted onto portions of the fastening shaft 40 in which a pair of first flat portions 43 is formed. The cylindrical portion 81 extends in the axis direction, and includes a first end 81a in the axis direction, a second end 81b in the axis direction, an outer peripheral surface 81c, and an inner peripheral surface 81d.

In the inner peripheral surface 81d of the cylindrical portion 81, a pair of second flat portions 81e is formed so as to face the first flat portions 43 of the fastening shaft 40, respectively, so that torque is transmitted. The release portion 82 is made of a tapered cam projection that projects radially outwardly from the outer peripheral surface 81c of the cylindrical portion 81. The release portion 82 (the cam projection) is able to engage with the engagement portion 65 of the cam follower arm 63 of the second tooth member 60.

In the cylindrical portion 81, a pair of slits 83 is formed. Each of the slits 83 extends from the first end 81a in the axis direction to a middle portion in the axis direction in the cylindrical portion 81. The slits 83 are provided at positions, respectively, that face each other in a direction orthogonal to a direction in which the first flat portions 43 and the second flat portions 81e face each other. In the cylindrical portion 81, there is a region in which the slits 83 are provided from the first end 81a in the axis direction in the cylindrical portion 81 to the middle portion in the axis direction in the cylindrical portion 81. The region is referred to as a circumferentially-discontinuous region 90 in which the cylindrical portion 81 becomes discontinuous in a circumferential direction K due to the slits 83. This means that the circumferentially-discontinuous region 90 is where there are gaps in the circumferential direction of the cylindrical portion 81. Meanwhile, in the cylindrical portion 81, there is a region in which the slits 83 are not formed, the region starting from the middle portion in the axis direction to the second end 81b in the axis direction in the cylindrical portion 81. The region is referred to as a circumferentially continuous region 100 that is continuous in the circumferential direction K. This means that the circumferentially continuous region 100 is formed in the whole circumference of the cylindrical portion 81 in the circumferential direction.

The circumferentially-discontinuous region 90 is divided by the slits 83 into a release portion-side circumferential region 91 on a side where the release portion 82 is provided, and an opposite-side circumferential region 92 on the opposite side with respect to the release portion 82 side. As shown in FIG. 5A, FIG. 5B, and FIG. 5C, in the opposite-side circumferential region 92 of the circumferentially-discontinuous region 90 of the cylindrical portion 81, a projecting portion 110 is formed in the second flat portion 81e of the inner peripheral surface 81d. The projecting portion 110 includes an apex part 111 and a pair of inclined surface portions 112, 113. The apex part 111 is made of a flat portion parallel to the second flat portions 81e. The inclined surface portions 112, 113 are disposed on both sides of the apex part 111, respectively, with respect to the axis direction of the cylindrical portion 81 (equivalent to the fastening shaft direction J), and inclined in opposite directions from one another.

As shown in FIG. 6A and FIG. 6B, the projecting portion 110 is elastically engaged with the first flat portion 43 of the fastening shaft 40, thus restraining backlash between the first flat portion 43 and the second flat portion 81e. As shown in FIG. 5A, each of the slits 83 includes an open end 83a and a closed end 83b. The cylindrical portion 81 includes a pair of linear edge portions 84 and a curved edge portion 85. The linear edge portions 84 define the slit 83 between them and extend in the axis direction of the cylindrical portion 81. The curved edge portion 85 connects the linear edge portions 84 via a curve and defines the closed end 83b. In the curved edge portion 85, a curvature radius R2 of a first adjacent portion 85b, which is a portion adjacent to the opposite-side circumferential region 92, is larger than a curvature radius R1 of a second adjacent portion 85a, which is a portion adjacent to the release portion-side circumferential region 91 (R2>R1).

Next, an operation of the tooth locking mechanism 6 is described. In an unlocked state shown in FIG. 6A, the release portion 82 of the release member 80 is engaged with the engagement portion 65 of the cam follower arm 63 of the second tooth member 60. Thus, the release member 80 maintains the second tooth 64 of the second tooth member 60 in a non-meshed state against the energizing member 70. In the non-meshed state, the second tooth 64 is released from meshing with the first tooth 51. When the operation lever 29 and the fastening shaft 40 are rotated in the locking direction (the anticlockwise direction in FIG. 6A) about the center axis C1 of the fastening shaft 40 from the unlocked state (the non-meshed state) shown in FIG. 6A, the release portion 82 (the cam projection) of the release member 80 and the engagement portion 65 of the cam follower arm 63 of the second tooth member 60 are disengaged from one another as shown in FIG. 6B. Because of this, the second tooth member 60 including the cam follower arm 63 is allowed to rotate in the anticlockwise direction by the energizing member 70. Therefore, due to the action of the energizing member 70, the second tooth member 60 rotates in the anticlockwise direction, and the second tooth 64 meshes with the first tooth 51. Thus, tooth locking is achieved. Accordingly, a meshed state in which the second tooth 64 meshes with the first tooth 51 is achieved.

On the contrary, when the operation lever 29 is rotated in the unlocking direction (the clockwise direction in FIG. 6B) from the locked state (the meshed state) shown in FIG. 6B, the release portion 82 is engaged with the engagement portion 65 of the cam follower arm 63, and allows the second tooth member 60 to rotate in the clockwise direction via the cam follower arm 63 against the energizing member 70, as shown in FIG. 6A. Therefore, the second tooth 64 and the first tooth 51 are no longer meshed with each other, and tooth locking is released.

As shown in FIG. 6A, according to the embodiment, in the unlocked state, the release member 80 allows the release portion 82 to be engaged with the second tooth member 60, and maintains the second tooth member 60 in the non-meshed state against the energizing member 70. During a transition from the unlocked state shown in FIG. 6A to the locked state shown in FIG. 6B, when the release portion 82 and the second tooth member 60 are disengaged from each other, energizing reaction force of the release member 80 against the energizing force of the energizing member 70 is released instantly.

In a case where the projecting portion 110 is not provided, and there is backlash between the first flat portions 43 of the fastening shaft 40 and the second flat portions 81e of the cylindrical portion 81 of the release member 80, respectively, sound of hammering can be generated between both of the flat portions 43, 81e when the energizing reaction force is released. In the embodiment, backlash between both of the flat portions 43, 81e is restrained by the action of the projecting portion 110 that is provided in the flat portion 81e of the release member 80 and elastically engaged with the flat portion 43 of the fastening shaft 40. Therefore, it is possible to restrain generation of sound of hammering between both of the flat portions 43, 81e when the energizing reaction force is released.

Further, the projecting portion 110 is disposed in the circumferentially-discontinuous region 90 that is discontinuous in the circumferential direction K of the cylindrical portion 81 because of the slits 83 provided in the cylindrical portion 81. Therefore, at the time of assembly, when the cylindrical portion 81 of the release member 80 is fitted and assembled to the fastening shaft 40, it is possible to elastically deform the circumferentially-discontinuous region 90 of the cylindrical portion 81 easily by the action of the slits 83 extending in the axis direction of the cylindrical portion 81 so as to assemble the cylindrical portion 81 to the fastening shaft 40. Thus, it is possible to restrain the projecting portion 110 from causing poor assembly performance of the tooth locking mechanism 6.

Further, the slits 83 in the cylindrical portion 81 of the release member 80 extend from the first end 81a in the axis direction to the middle portion in the axis direction of the cylindrical portion 81. The region from the middle portion to the second end 81b in the axis direction of the cylindrical portion 81 serves as the circumferentially continuous region 100 that is continuous in the circumferential direction K of the cylindrical portion 81. Therefore, even if a damage or the like occurs in the circumferentially-discontinuous region 90 in which the slits 83 are provided in the cylindrical portion 81 of the release member 80, the cylindrical portion 81 is prevented from falling off from the fastening shaft 40 by the circumferentially continuous region 100 of the cylindrical portion 81, thus achieving fail safe.

Further, the circumferentially-discontinuous region 90 of the cylindrical portion 81 of the release member 80 is divided by the slits 83 into the release portion-side circumferential region 91 and the opposite-side circumferential region 92 on the opposite side from the release portion side. The projecting portion 110 is disposed in the second flat portion 81e of the opposite-side circumferential region 92. Meanwhile, in the non-meshed state shown in FIG. 6A, engagement reaction force that the cylindrical portion 81 of the release member 80 receives from the second tooth member 60 via the release portion 82 acts in a direction in which the second flat portions 81e is separated from the first flat portions 43. The projecting portion 110 is provided in the second flat portion 81e of the opposite-side circumferential region 92, and the first flat portions 43 are formed in the fastening shaft 40. Therefore, it is possible to reduce a load applied to the projecting portion 110. Accordingly, it is possible to restrain permanent deformation of the projecting portion 110, thereby restraining generation of sound of hammering between both of the flat portions 43, 81e for a long period of time.

Further, the cylindrical portion 81 includes the linear edge portions 84 and the curved edge portion 85. The linear edge portions 84 define the slit 83 and extend in parallel to the axis direction. The curved edge portion 85 connects the linear edge portions 84 with each other through a curve and defines the closed end 83b of the slit 83. In the curved edge portion 85, stress applied to the first adjacent portion 85b tends to be higher than stress applied to the second adjacent portion 85a. The first adjacent portion 85b is adjacent to the opposite-side circumferential region 92, the opposite-side circumferential region 92 being disposed on the opposite side from the release portion side and provided with the projecting portion 110. The second adjacent portion 85a is adjacent to the release portion-side circumferential region 91. Therefore, in the embodiment, in the curved edge portion 85, the curvature radius R2 of the first adjacent portion 85b is larger than the curvature radius R1 of the second adjacent portion 85a. Thus, in the curved edge portion 85, it is possible to alleviate concentration of stress on the first adjacent portion 85b, thereby improving durability.

The disclosure is not limited to the embodiment. In the embodiment, the projecting portion 110 is provided in, for example, the second flat portion 81e in the opposite-side circumferential region 92 in the circumferentially-discontinuous region 90 of the cylindrical portion 81. Alternatively, although not shown, the projecting portion 110 may be provided in the second flat portion 81e of the release portion-side circumferential region 91 in the circumferentially-discontinuous region 90 of the cylindrical portion 81. Further, the projecting portion 110 may be provided in both of the second flat portions 81e.

Furthermore, although not shown, the projecting portion 110 may be provided in the first flat portion 43 of the fastening shaft 40. This means that the projecting portion 110 only needs to be provided in at least one of the first flat portion 43 of the fastening shaft 40 and the second flat portion 81e of the cylindrical portion 81. Further, although not shown, the outer peripheral surface of the fastening shaft 40 may be provided with one first flat portion 43 and a section of a part of the fastening shaft 40 thus has a D-shape. Also, the inner peripheral surface 81d of the cylindrical portion 81 may be provided with one second flat portion 81e.

Further, although not shown, a plurality of the projecting portions 110 may be provided in a single flat portion. Further, although not shown, a single slit 83 may be provided in the cylindrical portion 81. In this case, the slit 83 may extend from the first end 81a to the second end 81b in the axis direction of the cylindrical portion 81.

In addition to the foregoing, various changes may be made in the disclosure without departing from the scope of the disclosure.

What is claimed is:

1. A steering device comprising:
   a column shaft configured to extend and retract in a first axis direction;
   a column jacket including a lower jacket and an upper jacket fitted to the lower jacket, the column jacket supporting the column shaft so that the column shaft is configured to rotate, the column jacket being configured to extend and retract in the first axis direction during telescoping adjustment;
   a fastening mechanism including a fastening shaft, the fastening shaft being supported by the lower jacket and being configured to rotate, the fastening shaft having a first flat portion on an outer peripheral surface of the fastening shaft, the first flat portion extending in a second axis direction, the second axis direction being an axis direction of the fastening shaft, the fastening mechanism being configured to cause the lower jacket to fasten and hold the upper jacket via the fastening shaft;
   a first tooth member configured to move integrally with the upper jacket in the first axis direction;
   a second tooth member supported by the lower jacket so that the second tooth member is configured to rotate, the second tooth member being configured to mesh with the first tooth member as the second tooth member rotates;
   an energizing member configured to elastically energize the second tooth member so that the second tooth member meshes with the first tooth member in response to the fastening mechanism fastening the upper jacket; and
   a release member including:
      a cylindrical portion fitted onto the fastening shaft, the cylindrical portion having a second flat portion formed on an inner peripheral surface of the cylindrical portion, the second flat portion facing the first flat portion so as to be configured to transmit torque;
      a projecting portion formed on at least a first one of the first flat portion and the second flat portion, the projecting portion being elastically engaged with a second one of the first flat portion and the second flat portion, the projecting portion being configured to restrain backlash between the first flat portion and the second flat portion; and
      at least one slit formed in the cylindrical portion, the at least one slit extending in the second axis direction from a first end of the cylindrical portion; and
      a release portion is provided on an outer peripheral surface of the cylindrical portion and configured to engage with the second tooth member,
   wherein, upon the release member rotating along with rotation of the fastening shaft toward a fastening release side, the release member causes the release portion to be engaged with the second tooth member and rotate the second tooth member so as to displace the second tooth member to a non-meshed side against the energizing member.

2. The steering device according to claim 1, wherein:
   the projecting portion is disposed in a circumferentially-discontinuous region that is discontinuous in a circumferential direction by the at least one slit informed in the cylindrical portion.

3. The steering device according to claim 2, wherein:
   the at least one slit extends from the first end of the cylindrical portion to a middle portion of the cylindrical portion in the second axis direction; and
   the cylindrical portion includes a circumferentially continuous region extending from the middle portion in the second axis direction to a second end of the cylindrical portion, the circumferentially continuous region being continuous in the circumferential direction of the cylindrical portion.

4. The steering device according to claim 3, wherein:
a pair of slits including the at least one slit is provided such that the slits of the pair of slits are disposed at opposite positions in a direction orthogonal to a direction in which the first flat portion and the second flat portion face each other;
the circumferentially-discontinuous region is divided by the pair of slits into a release portion-side circumferential region and an opposite-side circumferential region, which is on an side opposite from a release portion side; and
the projecting portion is disposed on the second flat portion in the opposite-side circumferential region.

5. The steering device according to claim 4, wherein the cylindrical portion includes:
a pair of linear edge portions extending linearly along the at least one slit of the pair of slits and parallel to the second axis direction; and
a curved edge portion connecting the pair of linear edge portions in a curved shape and defining a closed end of the at least one slit, a curvature radius of a first adjacent portion being larger than a curvature radius of a second adjacent portion, the first adjacent portion being a portion of the curved edge portion adjacent to the opposite-side circumferential region, and the second adjacent portion being a portion of the curved edge portion adjacent to the release portion-side circumferential region.

* * * * *